United States Patent [19]

Schulz et al.

[11] 4,410,673

[45] Oct. 18, 1983

[54] SUSPENSION POLYMERIZATION WITH COSOLVENT PARTITIONING

[75] Inventors: Gerald O. Schulz; Dennis M. Wilson, both of Racine, Wis.

[73] Assignee: S. C. Johnson & Son, Inc., Racine, Wis.

[21] Appl. No.: 288,566

[22] Filed: Jul. 30, 1981

[51] Int. Cl.³ .................... C08F 2/18; C08F 220/06
[52] U.S. Cl. .................................. 526/202; 526/210; 526/317
[58] Field of Search ............... 526/202, 207, 210, 347

[56] References Cited

U.S. PATENT DOCUMENTS

| | | | |
|---|---|---|---|
| 3,166,534 | 1/1965 | Perrins | 526/202 |
| 3,661,827 | 5/1972 | Taft | 526/86 |
| 3,836,512 | 9/1974 | Chu | 526/207 |
| 3,979,352 | 9/1976 | Brady et al. | 526/210 |

*Primary Examiner*—Joseph L. Schofer
*Assistant Examiner*—Peter F. Kulkosky

[57] ABSTRACT

YAqueous suspension polymers are prepared from water insoluble and water soluble monomers in an aqueous dispersion using an oil soluble initiator. A cosolvent partitions the water soluble monomer into the insoluble monomer/polymer droplets. Molecular weight and product homogeneity are controlled with a mercaptan chain transfer agent.

9 Claims, No Drawings

SUSPENSION POLYMERIZATION WITH COSOLVENT PARTITIONING

BACKGROUND OF THE INVENTION

This invention relates to preparation of low molecular weight alkali soluble polymers by aqueous suspension polymerization. In particular, it relates to preparation of homogeneous, acid-containing, alkali-soluble copolymers in discrete polymer droplets under steady state conditions in an aqueous suspension of a polar cosolvent.

It has long been desired to prepare low molecular weight, acid-containing polymers in a low pressure, conventional reactor, which exhibit a uniformity of composition normally associated with polymers prepared in solution. Solution polymerization techniques employ large quantities of expensive solvents, which must be recovered by high-temperature stripping operations for economy, which operations may create safety problems. In addition, until now, it has proven difficult to prepare a homogeneous distribution of a low molecular weight copolymer product, utilizing solution polymerization techniques, of water soluble and water insoluble monomers.

Monoalkenyl aromatic and acrylic addition copolymers of number average molecular weight ($M_n$) from about 1000 to 5000 and weight average molecular weight ($M_w$) from 3000 to 8000 are often designated "solution polymers". Such acid-containing, alkali soluble copolymers are widely utilized in inks, floor finishes, paper coatings, paints and adhesives. For commercial use, these copolymers are often prepared in concentrates of high solids content. Often they are converted to water soluble "resin cuts" by reaction with a suitable base. To maintain satisfactory low viscosity, clarity and color, solution polymers should exhibit a relatively uniform composition and a low polydispersity index $(M_w)/(M_n)$, usually less than about two.

Heretofore, aqueous suspension systems were unsuitable for preparation of "solution polymers" of homogeneous composition and narrow molecular weight distribution adapted to yield clear, non-viscous ammoniacal solutions. Acrylic acid and other water soluble monomers normally employed in solution polymers partition strongly in the aqueous phase and tend to form an acrylic homopolymer, either as a shell around the water insoluble monomer/copolymer particles or as a discrete particle.

To overcome this problem, an approach was developed which promoted the solubility of acrylic acid monomer in the water insoluble comonomer (styrene) phase to yield a higher acrylic acid content copolymer. This approach utilized concentrated salt solutions to reduce the solubility of acrylic acid in the aqueous phase. This route did not succeed owing to the adverse effects on surface and interfacial tension created by the use of concentrated salt solutions, as set forth in U.S. Pat. No. 3,862,924.

Previous researchers studying emulsion polymerization of copolymer resins have reported that significant polymeric initiation takes place in the aqueous phase or on the latex' surface, rather than in the latex' core site, see *Jour. Appl. Poly. Sci.*, Vol. 23, 893–901 (1979) and *Jour. Appl. Poly. Sci.*, Vol. 20, 2583–2587 (1976). Accordingly, emulsion polymerization techniques do not permit preparation of homogeneous copolymers of water soluble and insoluble monomers.

SUMMARY OF THE INVENTION

As employed herein the term "acrylic monomer" includes (i) acrylic acid alone, (ii) mixtures of acrylic acid and an ester or other derivative of acrylic or methacrylic acid and (iii) methacrylic acid alone or mixtures of methacrylic acid and an ester or other derivative of acrylic or methacrylic acid.

As employed herein, the term "alkali soluble polymer" refers to the vinylic polymer formed from the free radical polymerization of a water insoluble vinylic monomer and an acid-containing water soluble vinylic monomer.

It is, accordingly, an object of this invention to provide an aqueous suspension polymerization process capable of producing clear, non-viscous, acid-containing, alkali-soluble polymers having homogeneous compositions and a low ratio of Mw/Mn.

These and other objects are attained in a aqueous suspension process for preparing low molecular weight alklisoluble polymers from a water insoluble vinylic monomer and an acid-containing water soluble vinylic monomer which comprises:

(a) conducting a polymerization reaction between said water soluble monomer and water insoluble monomer within nonaqueous copolymer droplets, under steady state conditions of (i) reduced steady state monomers concentration and (ii) enhanced polymerization rate, said droplets dispersed in a stabilized aqueous suspension of a polar, water insoluble cosolvent;

(b) employing (1) an oil soluble initiator and (2) a mercaptan chain transfer agent having low water solubility to foster polymerization in said nonaqueous phase and to promote homogeneous molecular weight distribution for said copolymer product, wherein said cosolvent efficiently partitions said water-soluble monomer, said initiator and said chain transfer agent into the polymer droplet to replace polymerized monomers therein, and;

(c) removing said cosolvent by distillation under surfactant stabilization to prevent agglomeration of said copolymer product.

In one embodiment in a reactor an aqueous mixture of a suspension stabilizer and a water insoluble, polar cosolvent are heated to a polymerization temperature between about 85° C. and 96° C. The mixture is maintained at the preselected temperature during the reaction. A premix of water insoluble and water soluble monomers is precharged to the reactor in an amount which approximates the expected steady state monomer concentration. The main monomer charge is fed to the mix, simultaneously with a premixed microemulsion of the oil-soluble initiator and tertiary mercaptan chain transfer agent. The cosolvent acts to partition the water soluble monomer into the polymerization site, which is the styrene/copolymer droplet.

The feed rate of the main monomer charge is set with regard to the initiator concentration and the desired steady state monomer concentration. The steady state monomer concentration should be low to permit efficient partitioning.

If desired, additional monomers and initiator are post-charged to the reaction mix to ensure reaction completion. After completion of polymerization, the cosolvent is removed by azeotropic distillation employing a surfactant for additional stabilization of the polymer beads.

A volatile entrainer may be employed for completing the removal of the cosolvent. Thereafter, copolymer product may be recovered as solid filterable beads. Alternatively, an alkali solution of the product may be prepared in-situ by the addition of an appropriate base.

It is essential to the process that reaction conditions be employed, which avoid water-soluble monomer polymerization in the aqueous phase. Accordingly, reaction initiation should occur only within the polymer droplet, if possible. Conditions which could promote diffusion of free radical fragments from the droplets (with concomitant particle nucleation and emulsion polymerization) are not favored. Accordingly, employing an addition rate of monomers, chain transfer agent and initiator, less than the polymerization rate, will result in steady state copolymerization, which ensures low molecular weight products having homogeneous molecular weight distribution (i.e. low ratio of Mw/Mn). Therefore, to achieve enhanced process efficiency, several important factors, such as the partition coefficient of the cosolvent, the polymerization kinetics, and the mechanism of molecular weight control utilizing the proper chain transfer agent, are to be taken into consideration.

DETAILED DESCRIPTION OF THE INVENTION

Stabilization of the suspension during polymerization and azeotropic distillation is required to prevent agglomeration of polymer droplets. The monomer-polymer droplet is sticky and, without a protective overcoat, tends to nucleate. To prevent agglomeration it is preferred to employ partially hydrolyzed polyvinyl alcohols of medium or high molecular weight. Other organic and inorganic suspending agents and protective colloids, may be substituted for the polyvinyl alcohols. For best results, however, the polyvinyl alcohols are employed. Fully hydrolyzed polyvinyl alcohols provide less satisfactory protection against agglomeration. Further, the low molecular weight, partially hydrolyzed polyvinyl alcohols also lack the degree of protection provided by the medium and high molecular weight polyvinyl alcohols.

Sufficient amounts of suspending agent are employed to promote stabilization during the process. In general for this and other purposes about 0.1% by weight of solids of suspending agent is employed. Best results are obtained at an addition level of about 0.2 to 1% on solids. Unless otherwise indicated, all weight percentages herein are based upon the total weight of the reaction mix. The weight of solids refers to the weight of non-volatiles in the reaction mix.

During the latter stages of polymerization and through the azeotrope distillation, there arises a heightened tendency for the concentrated, dispersed product beads to either agglomerate or emulsify. This destabilization tendency is prevented or reduced by the addition, prior to azeotrope distillation, of an anionic emulsion polymerization-type surfactant. The preferred surfactant is an alkali ester of sodium sulfo-succinic acid, especially the dioctyl ester, the dihexyl ester and, particularly, the bis (tridecyl) ester of sodium sulfo-succinic acid and salts thereof.

Other anionic surfactants, such as sulfates and sulfonates, and nonionic surfactants were unsatisfactory in preventing emulsion formation. In general, addition levels of surfactant from about 1 to 5 wt%, particularly 2.0 wt%, are employed.

A key feature of the present process is the use of a polar cosolvent with enhanced hydrogen bonding capacity to partition the water soluble monomer into the water insoluble monomer/copolymer droplet. A partitioning solvent is needed to prepare polymer compositions having a high water soluble monomer content by suspension polymerization. The water insoluble monomer/polymer droplet contains, for example, styrene and acrylic acid in the desired proportions. The comonomer feed, with the help of the partitioning effect of the cosolvent, replenishes the comonomers as quickly as they disappear (by copolymerization) to form styrene-acrylic acid copolymer (S/AA). The aqueous phase acts as a reservoir for the water soluble monomer in this regard. The relative concentration of acrylic monomer (AA) both in the droplet and in the aqueous phase is defined by the partition coefficient, K, as follows:

$$K = \frac{C_{AA}^{\frac{1}{2}} \text{(nonaq.)}}{C_{AA} \text{(aq.)}}$$

where $C_{AA}$ (non aq.) is the concentration of AA in the nonaqueous phase, and; where $C_{AA}$ (aq.) is the concentration of AA in the aqueous phase.

Because carboxylic acids associate in organic phases, the exponent $\frac{1}{2}$ is used in the equation for defining partition coefficient.

The partition coefficient for a given system is determined by shaking measured weights of water, monomers, and cosolvent in a ground glass-capped 100 ml. graduated cylinder. After allowing the layers to separate, the volumes of upper and lower layers are measured. AA (or MAA) is determined by titration of aliquots of the upper layer in 2:1 ethanol:toluene with 0.1 N NaOH using a phenolphthalein indicator. Using measured densities of the upper layer, the concentration and total weight of AA in the upper layer is calculated. A material balance or a simple titration of the aqueous phase provides the concentration of AA in the aqueous phase. K is calculated as follows:

$$K = \frac{\left(\frac{\text{g. } AA \text{ (non aq.)}}{\text{g. sample non aq.}}\right)^{0.5}}{\frac{\text{g. } AA \text{ (aq.)}}{\text{g. sample aq}}} =$$

$$\frac{\left(\frac{\text{(ml NaOH) (Normality NaOH) (Equiv. wt. } AA \times 10^{-3})}{\text{g. sample non aq.}}\right)^{0.5}}{\frac{\text{Wt. Total } AA - AA \text{ Wt. in non aq.}}{\text{g. aqueous phase}}}$$

Assuming that all the water-insoluble monomer, such as styrene, exists in the organic phase, the amount of cosolvent in the non-aqueous phase can be calculated from the difference of total weight organic phase and the calculated weights of styrene and AA in that phase. The effectiveness of a cosolvent is reduced by excess solubility in the aqueous phase.

The lower the amount of steady water-insoluble monomer the better the water soluble monomer will partition into the droplet since the ratio of cosolvent and water insoluble monomer will affect partitioning. It is preferred to determine K from compositions which approximate steady state monomer compositions. In this way a minimum amount of cosolvent can be determined.

It has been found that K will vary somewhat with temperature. Therefore, it is preferred that the determination of K be carried out at temperatures near the polymerization temperature. It also has been found that dissolved resin had no effect on the value of K. Therefore K should be constant throughout the polymerization.

Cosolvents are selected based on their ability to efficiently and economically partition the water soluble monomers into the non-aqueous droplet. The preferred cosolvents are polar, have good solvency for the water-soluble monomers, have relatively low water solubility, and are easily recovered.

Useful cosolvents should possess good hydrogen-bonding properties, but should also have relatively low water solubilities, generally 2-4% W/W. Cosolvents that possess higher water solubilities are themselves partitioned less strongly in the organic phase, and therefore lose some effectiveness.

For ready recoverability, it is desirable that the boiling point of the cosolvent be moderate, so that the azeotrope compositions contain high proportions of cosolvent. Generally the boiling point of the preferred cosolvents are less than about 140° C.

Typical cosolvents are $C_4$-$C_5$ alcohols, lower esters, and methyl isobutyl ketone.

A preferred class of cosolvents are the lower alkanols, especially the $C_4$ and $C_5$ alkanols, particularly n-pentanol.

The amount of cosolvent employed in the system is dependent, in part, upon the partition coefficient of the system and the desired steady state monomer concentration. In general, from about 10% to 50% by weight of solids of cosolvent is employed. For the preferred styrene and acrylic acid comonomer system, from about 15 to 42 by weight of total solids of cosolvent is employed.

In use, the cosolvent is charged completely to the reaction mix prior to initiation of polymerization. After completion of polymerization, the cosolvent is distilled off as an azeotrope for recovery and reuse. For best results the polymerization reactor is initially charged with the deionized water and cosolvent. Next, the suspension stabilizer is added, with stirring. The mixture is then heated to the desired reaction temperature depending upon the initiator and reactor model selected.

Thereafter, a precharge of comonomers having a composition of soluble and insoluble vinyl monomers calculated to induce rapid attainment of steady state conditions and higher steady state monomer conversion rates is added.

The amount of comonomers pre-charged should approximate, but not exceed, the steady state monomer composition (the free monomer present if the reaction is short-stopped at any time during the polymerization). Using the calculated pre-charge of monomers, and from the desired polymer composition the amount of AA that must be in the non-aqueous phase is determined. Using the partition coefficient equation, and with known value of K, the amount of AA present in the aqueous phase is calculated. The amount of AA charged is the total of AA expected in nonaqueous and aqueous phases.

In order for the product to be relatively homogeneous, polymerization must take place in the suspension droplet entirely, and steady state conditions should be operating. Monomer, initiator, and chain transfer feeds should act to transport these ingredients rapidly and uniformly through the aqueous phase into the particle bead and replace the monomers and adjuvants which have been consumed by the reaction.

When steady state conditions are achieved and the monomer feed rate $R_f$ is less than the maximum polymerization rate, $R_p$ max, the overall rate kinetics may be described as follows:

$$R_f = R_p = k_p \left( \frac{f k_d [I]}{k_t} \right)^{\frac{1}{2}} [M] \quad (1)$$

when $R_f < R_p$ max.
where:
$k_p$ is propagation rate constant
$k_d$ is initiator decomposition rate constant
$k_t$ is termination rate constant
f is initiator fraction initiating polymer chains
[I] is initiator concentration
[M] is monomer concentration Thus, for a true steady state condition to occur, the rate of polymer formed, $R_p$, must equal the rate of monomer addition, $R_f$ and the steady state monomer concentration must remain unchanged, i.e., $$\frac{d[M]}{d_t} = 0$$

Increasing $R_f$ correspondingly increases $R_p$, and this is accomplished by an accompanying increase in steady state monomer concentration [M].

Thus, at a given temperature, increasing $R_f$ increases the steady state monomer concentration, [M], but does not affect the steady state monomer conversion rates, i.e., $$\frac{R_p}{[M]} = \text{constant}$$

as indicated in equation (1).

The key factor for polymerization rate is the rate of free radical generation, as determined by initiator half life at the polymerization temperature. To reach the desired conversion rate, it is preferable to employ a significant precharge of comonomers and to utilize a gradual, as opposed to rapid, addition of initiator. Further, employing a higher reaction temperature also enhances attainment of desired reduced steady state concentrations and increased conversion rates.

Increasing the monomer feed rate $R_f$, increases the steady state monomer concentration [M]. As monomer concentration increases, the likelihood that aqueous polymerization will be initiated, is heightened.

Consideration of initiation in the polymerization process is important for the preparation of homogeneous products. In order to successfully carry out the polymerization, initiation and polymerization in the aqueous phase must be avoided. Therefore, it is essential that the initiators and all initiating species should have low water solubility. Initiator and chain transfer agent radical bearing fragments capable of initiating in the aqueous phase could lead to undesired emulsion polymerization and heterogeneous products.

One function of the initiator is to aid in maintaining a uniform and rapid polymerization rate to provide a reasonably low steady state monomers concentration and concomitant partitioning of water soluble monomer into the polymerization sites. To enhance initiator efficiency and provide desired enhanced polymerization rates and to provide product bead of finer particle size, it is preferable to gradually add initiator to the reaction mix. Precharging the initiator prior to the onset of polymerization or rapidly adding initiator yields premature destruction of initiator from the high radical concentrations produced. Employing high polymerization temperatures also induces early consumption of initiator.

For these and other purposes low temperature initiators are preferred. Typical initiators include organic peroxides, such as benzoyl, caproyl, lauroyl, cyclohexanone and decanoyl peroxides. Preferred results are obtained with perester initiators, such as tert-butyl peroxypivalate and, particularly, tert-butyl peroctoate. Mixtures of initiators may also be employed.

In general, from about 1 to 4 mole percent of initiator based on a stoichiometric conversion of monomers charged, is employed. The particular identity and quantity of initiator selected will depend, in part, upon the desired polymerization rate, the monomer addition rate, the reaction temperature and the like.

For best results a post-addition of initiator, subsequent to the final monomers addition, is employed to drive the reaction to completion. As the quantity of initiator employed is increased over about 4 mole percent or decreased beyond about 1 mole percent, the degree of heterogeneity of the copolymer product increases.

Selection of appropriate chain transfer agents for molecular weight control is essential for obtaining homogeneous, narrow molecular weight distribution polymers. It is important that the chain transfer agent radical species have low water solubility, otherwise aqueous polymerization may take place.

Chain transfer agents must be efficient, inexpensive, exhibit high transfer activity, produce controllable molecular weight distribution and not adversely affect the polymerization rates. The preferred transfer agents meeting these criteria are nontoxic mercaptans. Tertiary mercaptans, with the exception of toxic t-octyl mercaptan, are preferably employed, particularly $C_4$-$C_{16}$ tertiary alkyl mercaptans.

The normal (n—) mercaptans are generally more reactive than tertiary mercaptans and deplete before monomer conversions are completed. Accordingly, normal mercaptans may tend to produce an undesired distribution of higher molecular weight copolymers (or bimodality). Recognizing this possibility, one can alter the feed of mercaptan to reduce or prevent this undesired result.

Typical preferred tertiary mercaptans include tert-butyl, tert-octyl, tert-nonyl and tert-dodecyl mercaptan. Tertiary-hexadecyl mercaptan is particularly preferred.

In general, there is a reduction in polymerization rate and an increase in steady state monomer concentration with increasing addition levels of mercaptan. Accordingly, no greater than about 10 mole percent of mercaptan is employed. On the other hand, as the addition level of mercaptan is reduced both the polymer product polydispersity index and molecular weight increases, since chain transfer activity is reduced. Accordingly, no less than about 2 mole percent mercaptan is employed to provide a product Mw/Mn of less than about 2.

The mercaptan chain transfer agent is normally added to the reaction mix incrementally, along with the monomers and initiator. It has been found that increased homogeneity of copolymer product is attained as the molar ratio of mercaptan to initiator is increased. Accordingly, it is preferred to employ a molar ratio of mercaptan to initiator from 1:1 to 5:1. Employing a molar ratio less than about 1:1, for example at 0.4:1 results in cloudy ammonia cuts, indicative of heterogenity.

It has been found useful to add the main charge of initiator and chain transfer agent to the process as a microemulsion. To prepare the microemulsion the initiator and mercaptan transfer agent are added to an appropriate anionic surfactant, such as sodium lauryl sulfate. After stirring, a dilute salt solution is charged to the mix with stirring. A portion of the particular cosolvent selected for the process is slowly added until a stable translucent solution is formed.

After the polymerization reaction is completed and the final additions, if desired, of initiator, cosolvent and/or surfactant stabilizer have been made, the cosolvent is preferably removed from the reaction mixture. For low boiling cosolvents this step is accomplished by an azeotropic distillation to permit the cosolvent to be recovered and recycled to the process.

The distillation may be carried out by maintaining the reaction mix at the azeotropic temperature through the use of an inert gas, such as nitrogen or air, which gas is heated and sparged under the surface of the aqueous suspension. In one aspect, heating is accomplished by passing the gas through boiling water prior to use. Alternatively, the gas may be heated employing a heat exchanger.

During distillation the reaction mix is preferably agitated. In addition, to complete distillation, an entrainer, such as a hydrocarbon having a boiling point from about 90° C.–150° C., is supplied to the reactor to carry out the last traces of cosolvent. Heptane is a preferred entrainer.

The process is well adapted to prepare homogeneous, low molecular weight resins. Addition type alkali soluble resins are prepared from a water insoluble monomer and an acid-containing water soluble monomer. As employed herein the term "monomer" covers one species of monomer or mixtures of related species therewith, commonly employed in lieu thereof. The water insoluble monomer is a vinylic monomer, preferably a monoalkenyl aromatic monomer, such as α-methyl styrene, tertiary butyl styrene or, most preferably, styrene. Other water insoluble vinylic monomers are employed in this invention, such as vinyl acetate, methyl acrylate, methyl methacrylate, ethyl acrylate, butyl acrylate and the like.

The water soluble, acid containing monomer is preferably an acrylic monomer. Typical acrylic monomers include acrylic acid or methacrylic acid, either alone or admixed with hydroxyethyl methacrylate, methacrylonitrile, acrylonitrile or the like.

Other unsaturated acid monomers can be substituted in whole, or, in part, for acrylic or methacrylic acid. Such unsaturated acid monomers include maleic acid, crotonic acid, fumaric acid and itaconic acid.

Typical preferred addition copolymers formed by the process are: styrene/acrylic acid; styrene/α-methyl styrene/acrylic acid; methylmethacrylate/methacrylic acid; styrene/butyl acrylate/acrylic acid; styrene/ethylacrylate/acrylic acid/, and butyl acrylate/acrylic acid.

Especially preferred monomer charges include the comonomers, styrene and acrylic acid or the termonomers α-methyl styrene/styrene/acrylic acid. The ratio of water-insoluble monomer to water-soluble monomer can vary widely. For the preferred styrene/acrylic acid system the weight ratio of monomers is about 2:1. The ratio of α-methyl styrene to styrene is from about 1:2 to 2:1.

The produced alkali soluble resins may be converted in situ to a conventional resin cut—an aqueous solution of the resin with an alkaline substance, preferably having a fugitive cation. Suitable bases for this purpose include sodium or potassium hydroxide and, preferably, ammonia or ammonium hydroxide.

In general, the main comonomer charge and the microemulsion which contains the chain transfer agent and the initiator, are added over a period from about ½ to about 3 hours. The post-comonomer addition is preferably conducted over a period from ¼ to ½ hours.

To assist in stabilizing the product and to ensure reaction completion it may be desirable to maintain the reaction mix at the reaction temperature for a period of up to about one hour after the final additions of initiator, cosolvent and surfactant.

The following examples are set forth to illustrate with more clarity the principles and practice of the invention to one with ordinary skill in the art. As such, these examples are not intended to limit the invention, but are merely illustrative of certain preferred embodiments.

EXAMPLE 1

Into a round bottomed resin reactor fitted with a paddle stirrer, thermocouple, condenser, dual addition funnel, nitrogen inlet and heating mantle was charged 585 grams of deionized water and 87.5 grams of n-pentanol. After initiation of stirring, 0.65 grams of polyvinyl alcohol (87% hydrolyzed) (available under the trademark GELVATOL 20/90 from Monsanto Chemical Co.), was added. The resulting mixture was heated to 95° C., while all lines were purged with nitrogen.

A monomers precharge of 16.5 grams styrene and 25 grams acrylic acid was charged to the reactor and allowed to equilibrate for three minutes. The main monomers charge of 111.5 grams styrene and 45 grams acrylic acid was immediately started together with a microemulsion addition of initiator and chain transfer agent, which was prepared as follows:

Microemulsion Preparation:

25 grams t-hexadecyl mercaptan (3.5 mole percent) and 10.33 grams of t-butyl peroctoate were added to 2.5 grams of sodium lauryl sulfate and stirred well. A 1% KCL solution (12.5 grams) was then charged to the mixture. Thereafter, 19 grams of n-pentanol was slowly introduced until a translucent solution was maintained without fading.

The microemulsion and main monomers charge were gradually added over a 90 minute period, with stirring at about 150 rpm during the polymerization reaction. Thereafter, a post-monomers charge of 15 grams acrylic acid, 37 grams styrene and 3.4 grams t-butyl peroctoate (total 2.5 mole percent) was immediately started and gradually fed over a 20 minute period.

To stabilize the polymer beads, 7.2 grams of bis (tridecyl) ester of sodium sulfosuccinic acid (70% solution), available as Aerosol TR-70 from American Cyanamid Co., was charged to the reactor. During the polymerization and for one hour after the post additions were completed, the reaction temperature was maintained at from 95°–96° C.

Next, the n-pentanol was distilled off as a 50/50 n-pentanol-water azeotrope at 96° C. A heated air purge was started below the surface of the suspension to act as an entrainer for the azeotrope. When the distillation was 90% completed, 30 grams of heptane was gradually added over a 15 minute period below the surface of the solution. Distillation was continued for an additional 30 minutes. The resulting aqueous slurry of product beads analyzing at 64 styrene/36 acrylic acid was cooled, filtered in a Buchner funnel and dried in a 125° F. forced air drying oven. The free-flowing beads produced a clear 20% nonvolatiles ammonia cut. The copolymer had a $M_n$ of 3370, a $M_w$ of 7300, a $M_z$ of 14000 and a ratio of Mw/Mn of 2.17.

COMPARATIVE EXAMPLE 1

A suspension polymerization using styrene and acrylic acid monomers was carried out in accordance with the procedure of Example 1 with the following exceptions: The ingredients were:

| | | |
|---|---|---|
| styrene | 144 g. | |
| acrylic acid | 81 g. | |
| butyl mercaptopropionate | 8.28 g. | (2 mole %)—chain transfer agent |
| t-butyl peroctoate (98%) | 11.35 g. | (2 mole %)—initiator |
| n-pentanol | 78.75 g. | (35 wt % on solids) |
| polyvinyl alcohol (5% soln.) | 22.50 g. | (0.5 wt % Gelvatol 20/90) |
| deionized water | 404.15 g. | |
| bis (tridecyl)sodium sulfosuccinate (70% active) | 1.4 g. | (Aerosol TR-70) |

The initiator was charged to the water at 90° C. A monomers precharge of 0.5 g. styrene, 13 g. acrylic acid, and 0.9 g. initiator and suspension stabilizer was added to the mix, while the mix was at a reaction temperature of 87° C. Thereafter, the main monomers feed, 143.5 g. styrene, 68 g. acrylic acid and 7.38 g. chain transfer agent were charged over a two hour period with the reaction temperature rising slowly from 87° C. to 94° C. A hold period of 40 minutes at 95°–96° C. after the main charge addition ensured reaction completion. The surfactant (Aerosol TR-70) was charged during the hold period.

The alcohol was distilled off as an azeotrope. The product beads were recovered. The copolymer had an $\overline{M_n}$ of 3900, a $\overline{M_w}$ of 9600, an $\overline{M_z}$ of 23,200 and a ratio of Mw/Mn of 2.46.

EXAMPLE 2

The effect on the quality of produced copolymer was investigated as the level of mercaptan chain transfer agent was varied. A series of suspension polymers was prepared in accordance with the procedure of Example 1. The level of addition of tert-nonyl mercaptan chain transfer agent was varied from 0 mole % to 10 mole %. The molecular weight of the resulting S/AA polymer was tabulated as follows:

| Mole % | $\overline{Mn}$ | $\overline{Mw}$ | $\overline{Mz}$ | $\dfrac{\overline{Mw}}{\overline{Mn}}$ |
|---|---|---|---|---|
| 0 | 11,470 | 25,300 | 44,200 | 2.21 |
| 2 | 4,130 | 7,600 | 12,700 | 1.84 |
| 3.5 | 2,900 | 5,000 | 7,900 | 1.72 |
| 5 | 2,260 | 4,200 | 11,800 | 1.86 |
| 10* | 1,440 | 2,190 | 3,400 | 1.52 |

*tert-octyl mercaptan used.

EXAMPLE 3

The effect of increasing the ratio of chain transfer agent to initiator was demonstrated by preparing two batches of S/AA copolymer in accordance with the procedure of Example 1. In runs 1 and 2 the initiator was tert-butyl peroxypivalate. The copolymers were evaluated and the results reported as follows:

| Mole % initiator | Mole ratio mercaptan/initiator | Mn | Mw | Mz | Mw/Mn |
|---|---|---|---|---|---|
| 0.5 | 5.0:0.5 | 2140 | 3600 | 7,800 | 1.68 |
| 2.0 | 5.0:2.0 | 2480 | 4500 | 10,100 | 1.81 |

EXAMPLE 4

The effect of the identity of cosolvent on the partition coefficient for a given monomer system was illustrated by formulating a base system of 2.4 g. styrene, 3.6 g. acrylic acid, and 80 g. deionized water. To this system was added 10 grams of various cosolvents. The partition coefficient was calculated by titrating the monomer upper phase with 0.1 N NaOH. The composition of the upper monomer phase was also calculated and expressed in the following table as the weight fraction of acrylic acid to acrylic acid and styrene. Higher values indicate better partitioning of water soluble monomer for the nonaqueous phase. The results were as follows:

| Cosolvent | K | AA (nonaq.) / AA + S (nonaq.) | % of Cosolvent soluble in non-aqueous Phase |
|---|---|---|---|
| none | 2.3 | 0.045 | 100 |
| n-pentanol | 11.9 | 0.366 | 98 |
| isoamyl alcohol | 11.8 | 0.355 | 91 |
| 2-methyl-1-butanol | 11.4 | 0.344 | 89 |
| n-amyl alcohol | 11.5 | 0.349 | 91 |
| t-amyl alcohol | 12.1 | 0.302 | 51 |
| n-butanol | 11.6 | 0.308 | 61 |
| isobutyl acetate | 7.3 | 0.247 | 100 |
| isopropyl acetate | 8.3 | 0.256 | 83 |
| ethyl acetate | 8.6 | 0.228 | 57 |

EXAMPLE 5

To further demonstrate the effect of the identity of cosolvent on partition coefficient, test runs were carried out in accordance with the procedure of Example 4 with the following exceptions: The system was 0.3 g. methacrylic acid, 0.7 g. methyl methacrylate, 10-13 g. water and 1 g. cosolvent. The results were as follows:

| Cosolvent | K |
|---|---|
| none | 23.9 |
| isobutanol (20° C.) | 41.7 |
| isobutanol (70° C.) | 34.4 |
| isoamylalcohol | 47.1 |
| n-butanol | 45.5 |
| isopropanol | 26.4 |
| methylisobutylketone | 40.7 |
| ethylacetate | 36.4 |

The previous examples are illustrative only. Other variations and embodiments will be apparent to those with ordinary skill in this art. The invention is not to be limited except as set forth in the following claims.

What is claimed is:

1. Aqueous suspension process for preparing low molecular weight alkali-soluble polymers from a water insoluble vinylic monomer and an acid-containing water soluble vinylic monomer, which comprises:
    (a) conducting a polymerization reaction between said water soluble monomer and water insoluble monomer within nonaqueous copolymer droplets, under steady state conditions of (i) reduced steady state monomers concentration and (ii) enhanced polymerization rate, said droplets dispersed in a stabilized aqueous suspension of from 15 to 42 weight percent based on total nonvolatiles of a polar, water-insoluble lower alkanol;
    (b) employing (1) an oil soluble initiator and (2) a mercaptan chain transfer agent having low water solubility, to foster polymerization in said nonaqueous phase and to promote homogeneous molecular weight distribution for said copolymer product, wherein said lower alkanol efficiently partitions said water-soluble monomer, said initiator and said chain transfer agent into the polymer droplet to replace polymerized monomers therein, and;
    (c) removing said lower alkanol by distillation under surfactant stabilization to prevent agglomeration of said copolymer product.

2. The process of claim 1 in which the droplets are dispersed in an aqueous suspension stabilized with a partially hydrolyzed polyvinyl alcohol.

3. The process of claim 2 in which the alcohol is present in amounts from about 0.2 to 1% by weight of nonvolatiles.

4. The process of claim 1 in which the water insoluble monomer is a aromatic monoalkenyl monomer and the water soluble monomer is an acrylic monomer.

5. The process of claim 1 in which the initiator is a low temperature perester initiator.

6. The process of claim 1 in which the mercaptan chain transfer agent is a nontoxic tertiary alkyl mercaptan.

7. The process of claim 1 in which the molar ratio of mercaptan to initiator is from 1:1 to 5:1.

8. The process of claim 1 wherein said lower alkanol is selected from the group consisting of C-4 alkanols and C-5 alkanols.

9. The process of claim 1 wherein said lower alkanol is n-pentanol.

* * * * *